May 29, 1945.  C. G. KELLER  2,377,014
BRAKE ADJUSTING MECHANISM
Original Filed Dec. 3, 1938
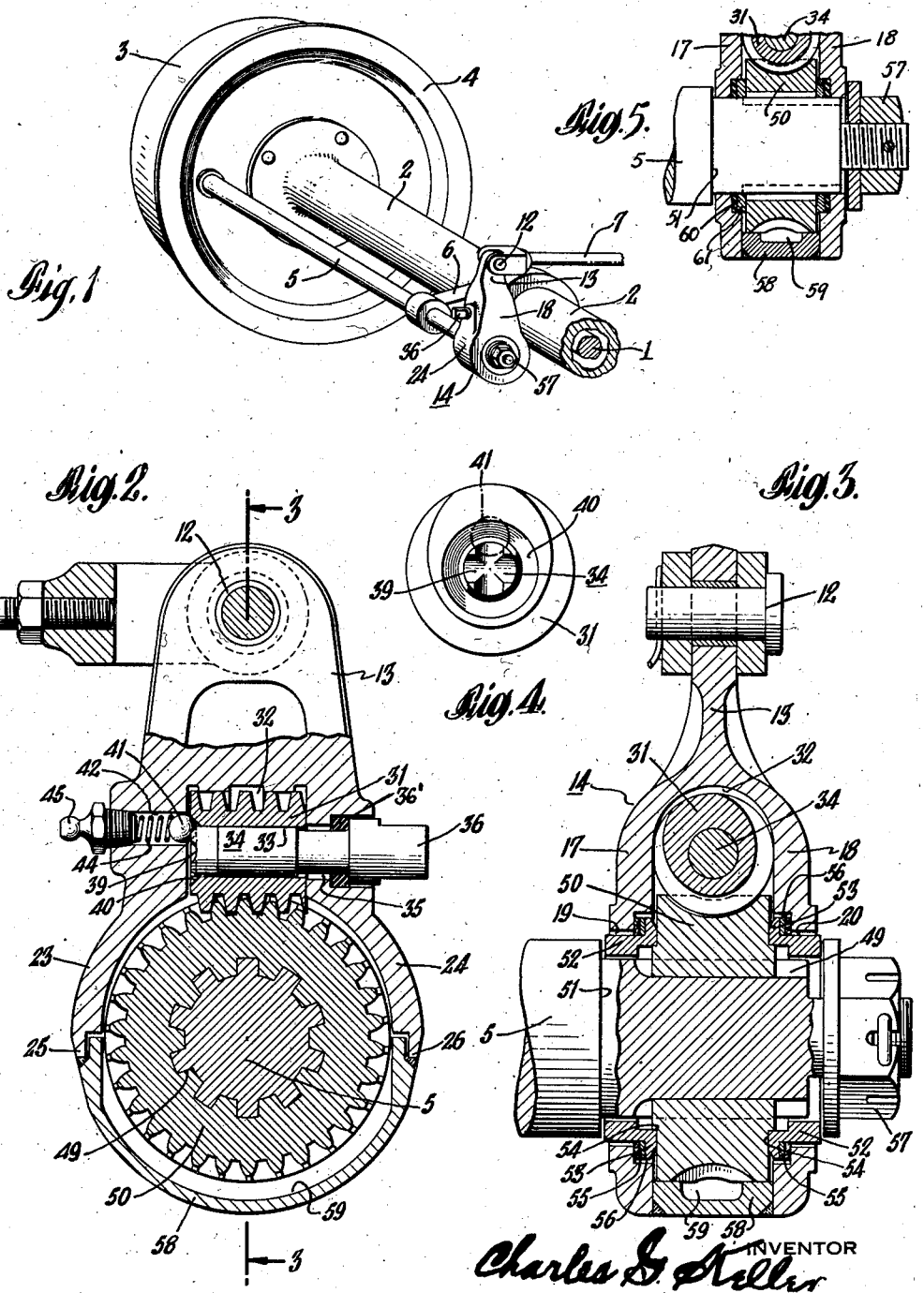
INVENTOR
Charles G. Keller
BY
Morgan Finnegan Durham
ATTORNEYS

UNITED STATES PATENT OFFICE 2,377,014

BRAKE ADJUSTING MECHANISM

Charles G. Keller, Hyde Park, N. Y.

Continuation of application Serial No. 243,811, December 3, 1938. This application March 5, 1941, Serial No. 381,918

9 Claims. (Cl. 74—522)

The invention relates to new and useful improvements in take-up connections between a longitudinally moving member and an angularly moving member, and more especially to such improvements in brake mechanisms, such as are used on automotive vehicles.

This application is a continuation of my prior copending application Ser. No. 243,811, filed December 3, 1938.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Fig. 1 is a perspective view of an embodiment of the invention applied to a brake mechanism;

Fig. 2 is an enlarged, detail side elevation of the take-up device shown in Fig. 1, with parts in section and other parts broken away;

Fig. 3 is a section on line 3—3 of Fig. 2;

Fig. 4 is an enlarged detail looking from the left at the worm and its shaft in Fig. 2; and Fig. 5 is a fragmentary sectional view showing a modified embodiment of the invention.

Objects of the invention are to provide a mechanism of the kind described having few, simple and sturdy parts, which are easily and economically manufactured, and are easily and simply assembled; to provide a novel housing having a minimum of parts and few openings, preferably only the two for the shaft, and with simple and effective means of sealing these.

The invention in some of its features is an improvement on the mechanism described and claimed in my United States Patent No. 2,012,011, dated August 20, 1935, but in other of its features the present invention may be applied to and embodied in other mechanisms than those of my aforesaid patent.

In the illustrated embodiment the invention is applied to a brake mechanism of the drum and expanding shoe type, the invention being applied to the shoe expanding mechanism to effect close adjustment thereof, one purpose of such adjustment being to maintain uniform and predetermined clearance between the brake drum and shoe irrespective of wear or other disturbing causes. In the embodied exemplary application, a driven axle 1 is shown enclosed within a non-rotating cylindrical housing 2, which supports the vehicle chassis. A brake drum 3 is fixed to the vehicle wheel in the usual manner, and the closure plate 4 for the end of the drum is mounted on the housing 2. A shaft 5 operates to effect expansion and contraction of the brake shoe in the usual manner. Shaft 5 is journaled in the plate 4 and in a bracket 6 supported on and extending from the stationary housing 2. The necessary partial rotation is imparted to the shaft 5 through a longitudinally movable rod 7 in applying or releasing the brake.

Referring now in detail to the illustrated embodiment the means for effecting adjustment between the rod 7 and shaft 5, comprises a housing mounted on the shaft 5 and connected to the brake rod 7 to be angularly moved thereby to actuate shaft 5 to apply and release the brake. The adjusting mechanism is enclosed within the housing as hereinafter described. The housing 14, in accordance with certain features of the invention is a unitary or complete closure, and has a single opening (other than the necessary openings for its operating shafts), through which opening the worm, worm wheel and associated parts are introduced, and are then assembled with the shaft after they are introduced, and after the parts are introduced and assembled said opening in the housing is closed by a single closure piece or plate. If convenient for manufacture the housing may be made in sections which can be made into a unitary structure by welding or otherwise, if desired. Because of said features the entire housing may be cast or formed in a single piece except for the final closure plate above described, and is so shown in the drawing. As shown, an arm 13 is integral with the body of the housing 14, the rod 7 being pivotally connected to said arm at 12. The housing structure comprises flat circular end walls 17 and 18, which are centrally apertured at 19 and 20 to receive the shaft 5. Integral with the side walls 17 and 18 are semi-cylindrical side walls 23 and 24. These side walls terminate in transverse edges 25 and 26, which extend across between the flat end walls 17 and 18 and are located substantially centrally of and at either side of the shaft 5 and of the worm wheel fixed thereon. The housing constitutes a complete closure for the mechanism except for the cylindrical opening which is thus left between the bottom part of the end walls 17 and 18 and the bottom edges 25 and 26 of the circular side walls. It is through this opening that the worm, worm wheel and other parts are inserted ready for assembling.

A worm 31 is positionable in a parti-cylindrical space 32 at the upper part within the housing, the circumference of the worm fitting the space with only turning clearance, and the worm filling the space lengthwise with like clearance. The worm has a central aperture 33, and an actuating shaft 34 has a driven fit therewithin, the shaft extending outwardly through an opening 35 in the housing, and having an end 36 shaped for the application of a turning tool. The forward end of shaft 34 is very slightly reduced to form a guide while the shaft is being driven into the gear aperture 33. An elastic, oil resistant washer 36' is compressed between the end 36 and opening 35 to prevent leakage of lubricant. The worm 31 at its other end cooperates with a detent device comprising a four-way parti-cylindrical set of grooves 39 formed in the end of the shaft 34, and an encircling beveled recess formed at the end of the axial aperture of the worm. A ball 41 engages in the recesses 39 and 40, the ball being also within the inner end of a cylindrical opening 42 formed in the housing wall, a spring 44 being in compression between the ball and a screw-threaded cap 45 which is screw-threaded into the opening 42. In addition to acting as a detent, this device is also used as lubricating means for the worm and worm wheel and for the entire interior of the housing.

The shaft 5 has a plurality of longitudinally-extending, angularly-spaced apart grooves 49 formed therein near its end, and a worm wheel 50 has a correspondingly-shaped axial aperture, the grooved portions fitting together to fix the worm wheel and shaft in axial relationship. The worm wheel 50 fits within the body of the housing and fills it with adequate turning clearance. Suitable spacing and sealing means between the shaft, worm wheel and housing are provided, and as embodied the shaft 5 may have a shoulder 51 spaced with clearance from ring 52, encircling the shaft and having on its inside face a flat annular flange 53. This flange abuts against the flat face of the worm wheel 50, with its inner annular surface resting against and in contact with the periphery of an outwardly shouldered portion 54, formed on the flat face of the worm wheel. Sealing rings 55 of heat and oil-resistant elastic material are interposed between the external faces of the annular flanges 53 of the sealing rings and the face of an annular recess 56 formed in the inner faces of the end walls of the housing and about the shaft openings. A similar construction is provided on the opposite side of the worm wheel, the parts being designated by the same reference numerals. A nut 57 is screw-threaded onto the end of the shaft 5 for retaining the complete assembly in place.

In assembling the mechanism, the worm 31 is introduced through the opening in the bottom of the housing into its parti-cylindrical space in the housing, and the worm actuating shaft 34 and elastic sealing ring are inserted from without the housing and the shaft 34 is driven home until the grooved end of the shaft abuts the end wall of the housing. Through this opening the spacing rings 52 and elastic sealing rings 55 are placed in position in their recesses in either side wall of the housing, and the worm wheel 50 is inserted through the opening in the housing and between the rings 52, and passes into mesh with the worm finding its own center. The semi-circular closure plate 58 is then put on to close the bottom opening in the housing to form a seat for the worm gear to rotate on its circumference. This semi-cylindrical plate may be fastened in any desired manner and is shown as being welded to the housing. The plate 58 has a recesssed portion 59 to receive a storage of lubricant. The device is then slid onto the shaft 5, the grooved portion on shaft 5 and within worm wheel 50 interlocking, and the nut 57 is turned up and fastened.

In use, the worm 31 and worm gear 50 bear on their peripheries against the cylindrical seats formed in the housing, rather than on their own shafts, and as the gear teeth tend to spread the gears away from each other, the gears are held firmly in the desired position with the assistance of the light pressure exerted by spring 44.

Figure 5 shows a modified embodiment in which the housing 17 is brought close to the shaft 5 and the space between them is closed by the compressed elastic washers 60, each of which may be provided with a metallic face 61.

The invention in its broader aspects is not limited to the specific mechanisms shown and described but departures may be made therefrom within the scope of the accompanying claims without departing from the principles of the invention and without sacrificing its chief advantages.

What I claim is:

1. A take-up connecting mechanism to be interposed between a longitudinally moving actuating member and an angularly movable shaft, including in combination, a housing mounted on the shaft, said housing having at one end a pivotal connection to the longitudinally movable actuating member, there being within the housing a parti-cylindrical portion adapted to receive a worm with turning clearance, a worm mounted within said portion, a shaft fixed axially to the worm and projecting from the housing, said housing having in communication with said parti-cylindrical part a cylindrical portion proportioned to receive with turning fit a worm wheel to mesh with said worm, and having shaft receiving apertures in the housing walls at either side of said worm wheel space, said housing having an opening at the opposite end from said pivotal connection sufficient to receive the worm wheel, and a plate for closing said worm wheel receiving opening in the housing.

2. A take-up connecting mechanism interposed between a longitudinally moving actuating member and an angularly movable shaft, including in combination, a housing mounted on the shaft, said housing having at one end a pivotal connection to the longitudinally movable actuating member, there being within the housing a parti-cylindrical portion adapted to receive a worm with turning clearance, said portion having a single shaft receiving aperture, a worm mounted within said portion, a shaft introducable through said aperture to be fixed axially to said worm and projecting from the housing, said housing having in communication with said parti-cylindrical part a cylindrical portion proportioned to receive with turning fit a worm wheel to mesh with said worm, and having shaft receiving apertures in the housing walls at either side of said worm wheel space, said housing having an opening at the opposite end from said pivotal connection sufficient to receive the worm wheel, and a plate for closing said worm wheel receiving opening in the housing.

3. A take-up connecting mechanism to be interposed between a longitudinally moving actuating member and an angularly movable shaft, including in combination a housing to be mounted on the shaft, said housing having one end open to receive a worm and worm wheel, a worm mounted within said housing, a shaft fixed axially to said worm and projecting from the housing, said housing having a cylindrical portion having flat side walls, with aligned shaft receiving openings in said side walls, a worm wheel mounted within said cylindrical portion of the housing and meshing with said worm, resilient means between the side walls and the worm wheel, means for connecting said shaft and worm wheel to move angularly together, and a closure for said opening in the housing.

4. A take-up connecting mechanism to be interposed between a longitudinally moving actuating member and an angularly movable shaft, including in combination a housing mounted on the shaft, one end of the housing being open to receive a worm wheel, a worm mounted within said housing, said housing having a cylindrical portion having flat side walls, there being aligned shaft receiving openings in said side walls, a worm wheel mounted within said cylindrical portion of the housing and meshing with said worm, a shaft adapted to pass through said openings and through the worm wheel within the housing, means for connecting said shaft and worm wheel to move angularly together, and a closure for said opening in the housing.

5. A take-up connecting mechanism to be interposed between a moving member and an angularly movable shaft, including in combination a housing for enclosing a worm, worm wheel and its shaft, having as a unitary structure flat, circular end walls centrally apertured to receive a shaft, there being a parti-cylindrical bottom opening in said housing structure through which a worm and worm wheel may be inserted, a worm wheel within the housing, fixed angularly on said shaft, a worm within the housing meshing with the worm wheel, a shaft for said worm extending outside the housing, and a parti-cylindrical plate closing said opening in the housing after the parts have been assembled within the housing.

6. A take-up connecting mechanism to be interposed between a moving member and an angularly movable shaft, including in combination a housing for enclosing a worm, worm wheel and its shaft, having as a unitary structure flat, circular end walls centrally apertured to receive a shaft, and an integral, outwardly extending arm to which the moving member may be connected, there being a parti-cylindrical bottom opening in said housing structure through which a worm and worm wheel may be inserted and removed, a worm wheel within the housing, fixed angularly on said shaft, a worm within the housing, meshing with the worm wheel, and having an axial aperture, a shaft having a driven fit within the axial aperture in said worm and extending outside the housing, a pair of sealing rings at either side of the worm wheel in compression between the housing side walls, sealing means between said ring and the housing, and a parti-cylindrical plate closing said opening in the housing after the parts have been assembled within the housing.

7. A take-up connecting mechanism to be interposed between a moving member and an angularly movable shaft, including in combination a housing for enclosing a worm, worm wheel and its shaft and comprising flat, circular end walls centrally apertured to receive the shaft, means to which the moving member may be connected, there being a parti-cylindrical bottom opening in the housing structure through which a worm and worm wheel may be inserted and removed, a worm wheel within the housing fixed angularly on said shaft, a worm within the housing, meshing with the worm wheel, and having an axial aperture, a shaft having a driven fit within the axial aperture in said worm and extending outside the housing, and a parti-cylindrical plate closing said opening in the housing after the parts have been assembled within the housing.

8. A take-up connecting mechanism to be interposed between a moving member and an angularly movable shaft, including in combination a housing for enclosing a worm, worm wheel and its shaft and comprising flat, circular end walls centrally apertured to receive the shaft, a worm and worm wheel within the housing, resilient friction washers between the sides of the worm wheel and the end walls of the housing, and an externally projecting shaft connected for turning the worm.

9. A take-up connecting mechanism to be interposed between a moving member and an angularly movable shaft, including in combination a housing for enclosing a worm, worm wheel and its shaft and comprising flat, circular end walls centrally apertured to receive the shaft, a worm and worm wheel within the housing in mesh with each other, said housing being internally recessed to receive the worm and worm wheel and to form a bearing surface for the peripheries of the worm and worm wheel, and serving to hold the worm and worm gear against rotation when the parts are under pressure, and resilient friction washers between the sides of the worm wheel and the end walls of the housing for holding the worm wheel at other times.

CHARLES G. KELLER.